US012678909B1

(12) United States Patent
Boldt et al.

(10) Patent No.: US 12,678,909 B1
(45) Date of Patent: Jul. 14, 2026

(54) WORKPIECE LOADER ASSEMBLY

(71) Applicant: Allways Precision, LLC, Plainfield, IL (US)

(72) Inventors: Evan D. Boldt, Naperville, IL (US); Eliot Stepka, Plainfield, IL (US); Jim Moscato, Woodridge, IL (US); Rich Ebner, Yorkville, IL (US)

(*) Notice: Subject to any disclaimer, the term of this patent is extended or adjusted under 35 U.S.C. 154(b) by 0 days.

(21) Appl. No.: 19/292,710

(22) Filed: Aug. 6, 2025

(51) Int. Cl.
*B24B 5/35* (2006.01)
*B23Q 7/05* (2006.01)
*B65G 27/08* (2006.01)

(52) U.S. Cl.
CPC .............. *B24B 5/355* (2013.01); *B23Q 7/055* (2013.01); *B65G 27/08* (2013.01); *B23Q 2705/14* (2013.01)

(58) Field of Classification Search
CPC .... B24B 5/355; B23Q 7/055; B23Q 2705/14; B65G 27/08
See application file for complete search history.

(56) References Cited

U.S. PATENT DOCUMENTS

| | | | |
|---|---|---|---|
| 1,305,535 A | 6/1919 | Grabowiecki | |
| 2,199,457 A | 5/1940 | Haas | |
| 2,211,685 A | 8/1940 | Binns et al. | |
| 3,571,981 A | 3/1971 | Schaller et al. | |
| 3,655,067 A | 4/1972 | White | |
| 3,660,946 A | 5/1972 | Thayer | |
| 3,724,648 A | 4/1973 | Schaller | |
| 3,876,255 A | 4/1975 | Ilon | |
| 4,167,081 A | 9/1979 | Marmo | |
| 4,434,583 A * | 3/1984 | Burgess, Jr. ............ B24B 5/355 198/771 |
| 5,921,850 A * | 7/1999 | Brooks .................... B24B 5/355 451/331 |
| 7,147,542 B2 | 12/2006 | Memmelaar, Sr. et al. | |
| 11,554,922 B2 | 1/2023 | Adam | |
| 2013/0192954 A1* | 8/2013 | Fourney ................. B65G 39/12 198/786 |

FOREIGN PATENT DOCUMENTS

| | | | | |
|---|---|---|---|---|
| CN | 108115478 A | * | 6/2018 | ............ B24B 5/355 |
| CN | 110549178 A | * | 12/2019 | ............ B24B 5/355 |
| EP | 2361856 A2 | | 8/2011 | |

* cited by examiner

*Primary Examiner* — Thomas Randazzo
(74) *Attorney, Agent, or Firm* — Kritzer McPhee LLP

(57) ABSTRACT

Various embodiments of loader assemblies are disclosed for controlling the translational and rotational movement of a workpiece. One or more pairs of offset compound wheels are configured to support and control a workpiece. In one configuration, a left-handed mecanum wheel is paired with an offset right-handed mecanum wheel. By rotating offset compound wheels independently of each other, the workpiece can be made to move forward or backward, and at the same time have an independently controlled clockwise or counterclockwise rotational motion.

20 Claims, 13 Drawing Sheets

WORKPIECE LOADER ASSEMBLY

BACKGROUND

A centerless grinder is a precision machining tool used to grind cylindrical workpieces (such as bars) without requiring them to be held between centers or in a chuck. In operation, a workpiece rests on a workrest blade and is in contact with two wheels rotating in the same direction on either side of the workpiece. The grinding wheel performs the actual material removal and surface finishing. A smaller regulating wheel controls the workpiece's rotational speed and axial feed rate. The workpiece is positioned between these wheels and sits on an adjustable work rest that provides support during the grinding process. The regulating wheel is mounted at a slight angle to the grinding wheel, which creates a feed motion that moves the workpiece through the grinding zone. This angular positioning, combined with the regulating wheel's rotation, generates both the rotational movement of the workpiece and its longitudinal travel along the machine. Centerless grinding offers several advantages over other types of grinding methods. The process typically produces excellent roundness and surface finish while maintaining tight dimensional tolerances.

A centerless grinder requires that a workpiece is fed into the grinding zone. In a traditional through feed process, a loader assembly will move a workpiece laterally toward the centerless grinder. As the workpiece is ground, the regulating wheel and grinding wheel will also spin the workpiece at a particular rotational speed. Typically, the speed of rotation is much higher than the speed of advance. Another loader assembly is positioned on the exit side of the centerless grinder to receive and control the workpiece as it exits the grinder.

U.S. Pat. No. 3,655,067 discloses an automatic bar feeder for a centerless grinder. The bar feeder comprises conventional adjustable bar-supporting rollers carried by a horizontal guide tube, and a skewed motor-driven drive wheel engages a bar to feed it into the grinder.

U.S. Pat. No. 5,921,850 describes an apparatus for loading a workpiece into a through-feed mechanism, which advances the workpiece through a processing device such as a centerless grinder. A roller assembly, comprising a pinch roller and a roller chain, is driven by a motorized drive train. The roller assembly grips the workpiece and urges it toward the through-feed mechanism.

Centerless grinding often requires repeat passes of a workpiece to achieve the desired dimension and/or surface finish. Because a centerless grinder is configured for grinding operations when the workpiece travels in one direction, the workpiece must be returned to the entry side of the centerless grinder before another pass can be completed. One traditional method return a workpiece is to employ a separate return system that moves the workpiece laterally and passes it around the grinding and regulating wheels, then moves it laterally back into position it for another pass through the grinder. Another traditional method is to open the grinding and regulating wheels, then reverse the operation of the loader to spin the workpiece in the reverse direction. However, much of the resulting motion is rotational, with only a small component of lateral motion backward, resulting in a slow movement of the workpiece back to its original position on the entry side of the centerless grinder. There exists a need for an assembly that can return a workpiece quickly and efficiently from the exit side to the entry side of a centerless grinder.

When a workpiece is being ground by a centerless grinder, the workpiece exerts a separating force between the grinding wheel and the regulating wheel. When a workpiece is first being fed into a centerless grinder, only part of the workpiece is positioned between the grinding wheel and the regulating wheel and thus does not exert the same total force. As a result, a narrowed taper can form at the leading end of the workpiece. This phenomenon is referred to as pinch-in. A similar effect is observed as the trailing end of the workpiece exits the grinder and less of the workpiece is present to apply a separating force between the grinding wheel and the regulating wheel. The difference in pressure can leave a notch at the trailing end of the workpiece. This phenomenon is referred to as pinch-out. There exists a need for an assembly that monitors the speed and position of a workpiece as it enters and exits a centerless grinder to trigger the grinder to retract in order to reduce or eliminate the effects of pinch-in and pinch-out.

When a loader assembly is configured to advance a workpiece laterally into the centerless grinder but relies on the regulating wheel and grinding wheel to impart a rotational speed to the workpiece, the wheels on the loader assembly wheels can be worn down due to the rotational movement of the workpiece at a direction perpendicular to the natural motion of the wheels. Larger bars with significant inertia (>1.5") will notch (lose roundness) on the leading edge since the bar is not spinning as it makes contact with the grinding and regulating wheel. There exists a need for an assembly configured to more efficiently provide and accommodate translational and rotational motion of a workpiece during grinding operations. Other manufacturing operations (such as thread rolling or bar straightening) and non-manufacturing operations (such as handling of cylindrical packages or products), may also benefit from translational and rotational motion that matches the motion required by the operation.

Centerless through grinding operations may involve workpieces with a diameter from approximately ⅛-inch to approximately 6 inches and a length from approximately 5 feet long to approximately 50 feet long. The diameter of a workpiece impacts the desired rotational and translational speed during grinding. Thus, there exists a need for an assembly configured to accommodate workpieces in a wide variety of diameters and lengths and to facilitate grinding operations at different translational and rotational speeds.

SUMMARY

Various embodiments of loader assemblies are disclosed for controlling the translational and rotational movement of a workpiece. A pair of offset compound wheels is configured to support a workpiece. In some embodiments, multiple offset pairs of compound wheels are configured to cooperate together to support and control a workpiece. One example configuration of a pair of compound wheels comprises a left-handed mecanum wheel paired with an offset right-handed mecanum wheel.

By rotating the wheels independently of each other, the workpiece can be made to move forward or backward, and at the same time have a clockwise or counterclockwise rotational motion. Further, control of the offset compound wheels enables control of the speed of translational motion and the speed of rotation independently of each other. In one example, a workpiece can be slowly advanced while rotating at a desired speed, then by adjusting the speed and direction of each of the offset compound wheels, the same workpiece can be quickly returned without any rotation.

BRIEF DESCRIPTION OF THE DRAWINGS

The detailed description makes reference to the accompanying figures wherein.

The figures are intended to facilitate the description of the principles disclosed herein. The figures do not illustrate every aspect and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

As used herein, the term "compound wheel" comprises an omnidirectional wheel or a mecanum wheel. The terms "first," "second," and the like may refer to different or identical objects. The terms "left" and "right" are meant to illustrate the principles herein, and where suitable to the situation, an item described as "left" may be positioned on the "right" and vice versa. The foregoing terms are used to illustrate the principles disclosed herein and are not intended to be limiting. Other explicit and implicit definitions may also be included below.

Figure 1:
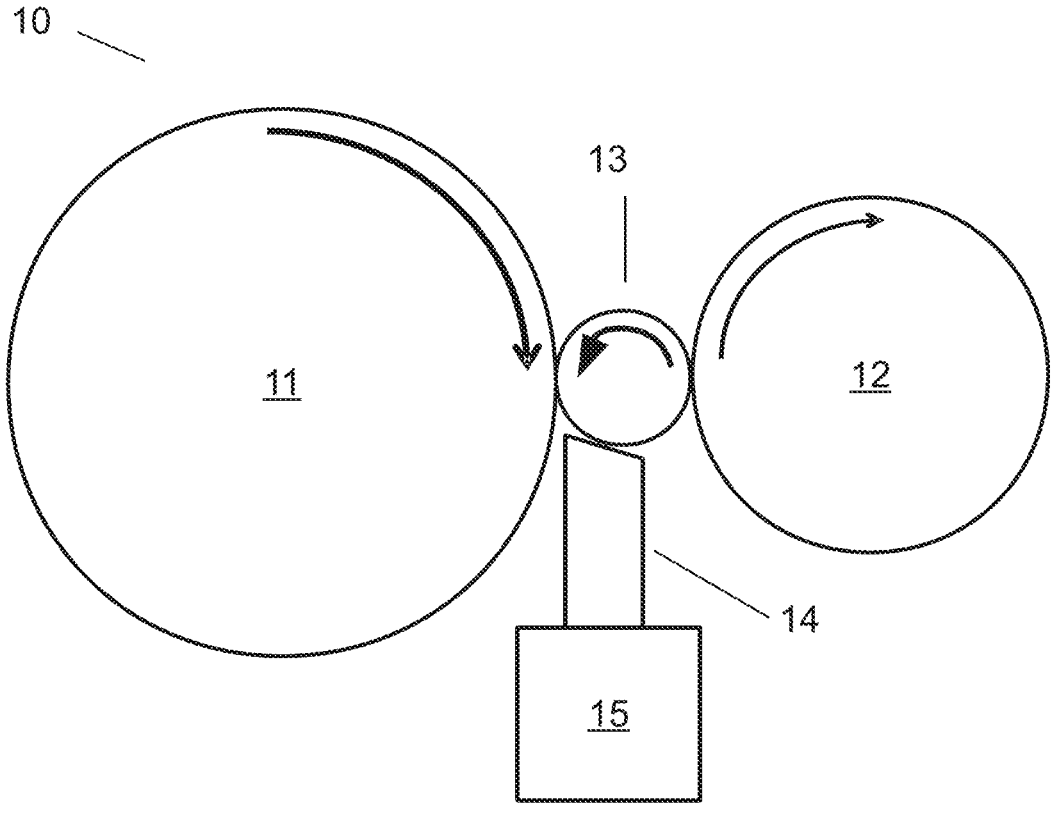
FIG. 1 illustrates a schematic cross-sectional view of a centerless grinder.

FIG. 1 depicts a schematic cross-sectional view of a centerless grinder 10. Grinding wheel 11 spins clockwise, and regulating wheel 12 spins clockwise. Workpiece 13 is positioned between grinding wheel 11 and regulating wheel 12 and spins counterclockwise while being ground and/or resurfaced by grinding wheel 11. Workrest 15 supports work blade 14, which supports and aligns workpiece 13 as it is being ground.

Figure 2:
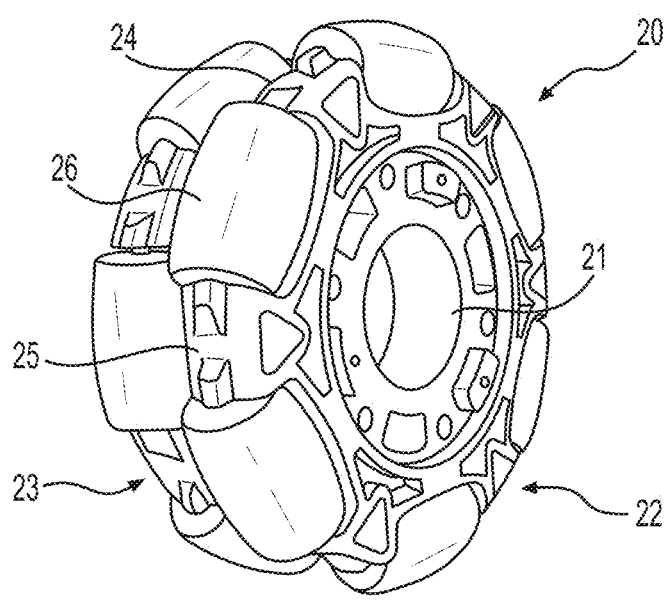
FIG. 2 illustrates a conventional omni wheel.

An example of an omnidirectional ("omni") wheel is described in U.S. Pat. No. 1,305,535. With reference to FIG. 2, an omni wheel 20 comprises a central hub 21 having a substantially circular configuration. The omni wheel 20 shown comprises a first disc 22 and a second disc 23, each comprising a plurality of roller assemblies mounted circumferentially around the respective disc. An example roller assembly is shown by first arm 24 and second arm 25, each of which extend outward from the central hub 21. Roller 26 is mounted between first arm 24 and second arm 25. A bearing system enables free rotation of each roller. The central hub 21 is configured to be mounted to a drive axle or motor shaft.

When an omni wheel is in contact with the surface of another object, the configuration of rollers allows the object to move in a direction parallel to the omni wheel's axis with little or no friction from the rollers. Rotation of the omni wheel about its axis will impart a force on the surface of the other object that is tangential to the direction of rotation of the omni wheel.

Figure 3:
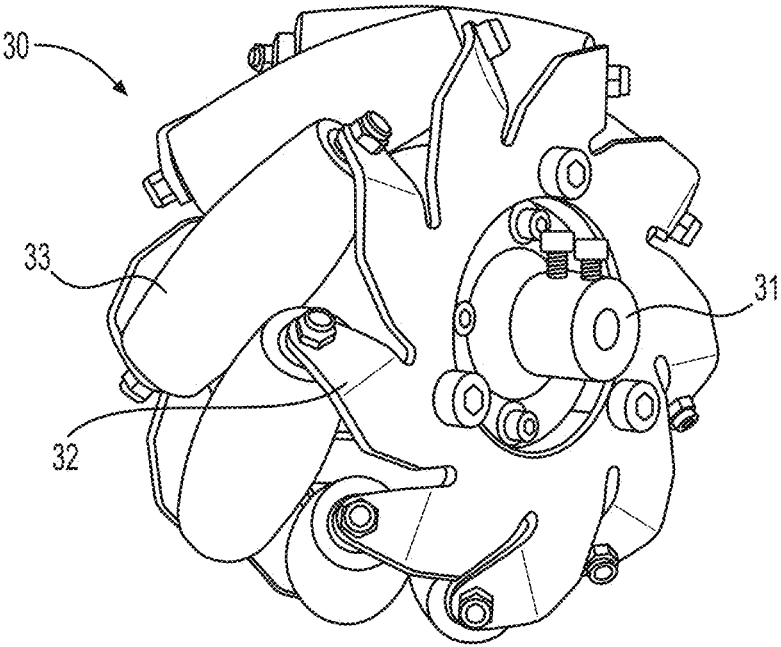
FIG. 3 illustrates a conventional mecanum wheel.

An example of a mecanum wheel is described in U.S. Pat. No. 3,876,255. With reference to FIG. 3, a mecanum wheel 30 comprises a central hub 31 and a series of rollers mounted around the outer circumference of wheel. An example roller assembly is shown by first arm 32 and a second arm (not visible), each of which extend outward from the central hub 31. The central hub 31 is configured to be mounted to a drive axle or motor shaft. Roller 33 is mounted between first arm 32 and the second arm. Each roller is mounted with a mounting pin and incorporates ball bearings or roller bearings to facilitate free rotation about the mounting pin axis.

Each roller is mounted between a pair of arms such that the roller is oriented at an angle $\theta$ relative to the mecanum wheel's radial direction. When the mecanum wheel is in contact with the surface of another object, and the mecanum wheel rotates about its central axis, the rollers consecutively contact the object surface, and each roller rotates freely about its own axis. The angled orientation of the rollers creates force components on the object that are both parallel and perpendicular to the wheel's primary rolling direction. The force is primarily in the direction of the roller axis pointed in the orientation of wheel torque.

An example of a conveyor incorporating mecanum wheels is described in U.S. Pat. No. 11,554,922. According to the '922 patent, the use of mecanum wheels enables precise diversion of products relative to their longitudinal forward movement while maintaining the longitudinal driving.

Figure 4:
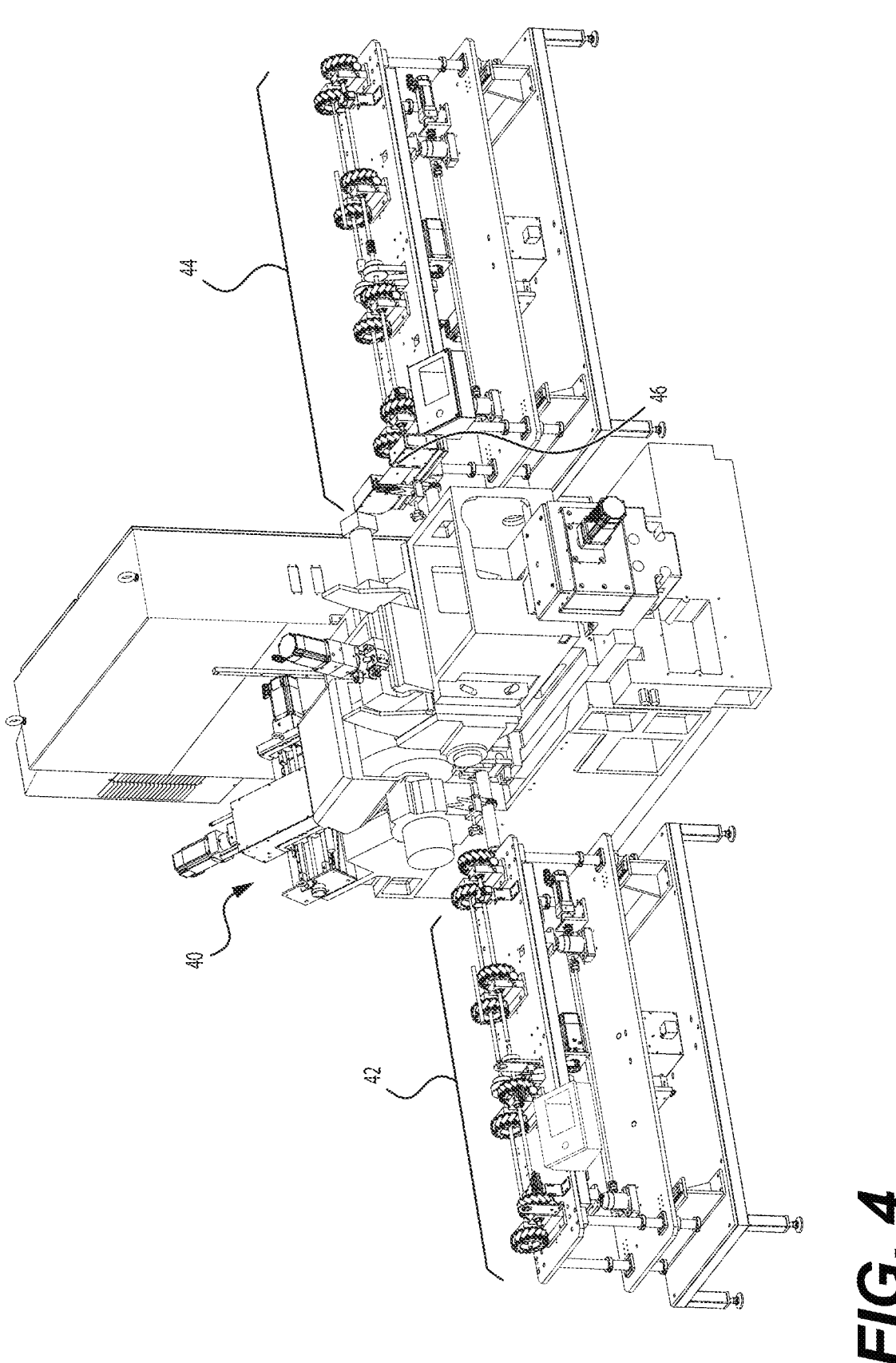
FIG. 4 illustrates a centerless grinder assembly with two loader assemblies.

FIG. 4 shows a centerless grinder assembly 40. A loader assembly 42 feeds a workpiece into the centerless grinder assembly 40 from the left side of the view. A loader assembly 44 receives the workpiece after grinding. Loader assembly 42 and loader assembly 44 are substantially identical, except that loader assembly 44 comprises an optional measurement gauge 46 to measure the resulting diameter of the workpiece as it exits the centerless grinder assembly 40.

Loader assemblies in accordance with this disclosure may comprise other equipment and features, such as a bundler or debundler, without departing from the principles disclosed herein.

Figure 5:
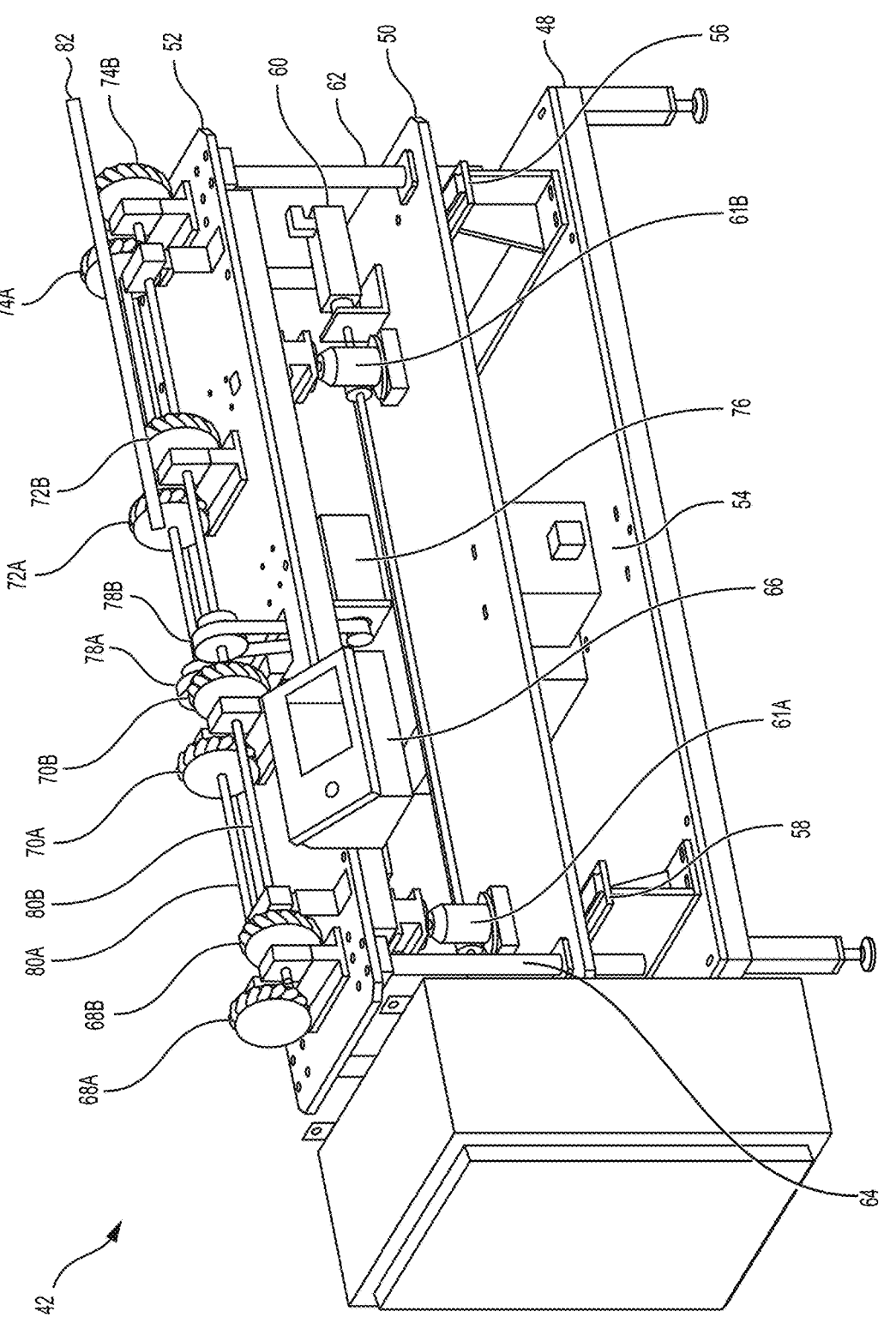
FIG. 5 illustrates a loader assembly in accordance with the principles disclosed herein.

FIG. 5 shows a closer view of loader assembly 42. A lower platform 48 is slidably coupled to and supports a middle platform 50 via slide tracks 56 and 58. Side servomotor 54 is configured to move and control the position of middle platform 50 along slide tracks 56 and 58. An upper platform 52 is movably coupled to middle platform 50 via guided posts, including guided posts 62 and 64 visible in FIG. 5. A height servomotor 60 controls and powers height jacks 61A and 61B, which raise and lower the upper platform 52. Control console 66 is communicatively coupled to side servomotor 54 and height servomotor 60 and is configured to enable a controller to set and adjust the height and horizontal position of upper platform 52 along with the components coupled to it.

Four pairs of mecanum wheels are coupled to upper platform 52. Left mecanum wheel 68A and right mecanum wheel 68B form a first pair, left mecanum wheel 70A and right mecanum wheel 70B form a second pair, left mecanum wheel 72A and right mecanum wheel 72B form a third pair, and left mecanum wheel 74A and right mecanum wheel 74B form a fourth pair. Mecanum drive motor 76 drives right rotation drive wheel 78B, which is coupled to right rotation drive shaft 80B, which is coupled to right mecanum wheels 68B, 70B, 72B, and 74B. Another mecanum drive motor (not shown) drives left rotation drive wheel 78A, which is coupled to left rotation drive shaft 80A, which is coupled to left mecanum wheels 68A, 70A, 72A, and 74A. A workpiece 82 rests atop the mecanum wheels.

Control console 66 is communicatively coupled to mecanum drive motor 76 and is configured to enable a controller to set and adjust the rotational direction and rotational speed of right mecanum wheels 68B, 70B, 72B, and 74B. Control console 66 is communicatively coupled to another mecanum drive motor (not shown) and is configured to enable a controller to set and adjust the rotational direction and rotational speed of left mecanum wheels 68A, 70A, 72A, and 74A. In operation, an operator can set the desired translational and rotational speeds for a workpiece, and the required speeds for the left and right mecanum wheels will be computed to produce the desired result. In other embodiments, one or more other control means (such as knobs, levers, buttons, and/or touchscreens) may be used in place of, or in addition to, a control console.

Figure 6:
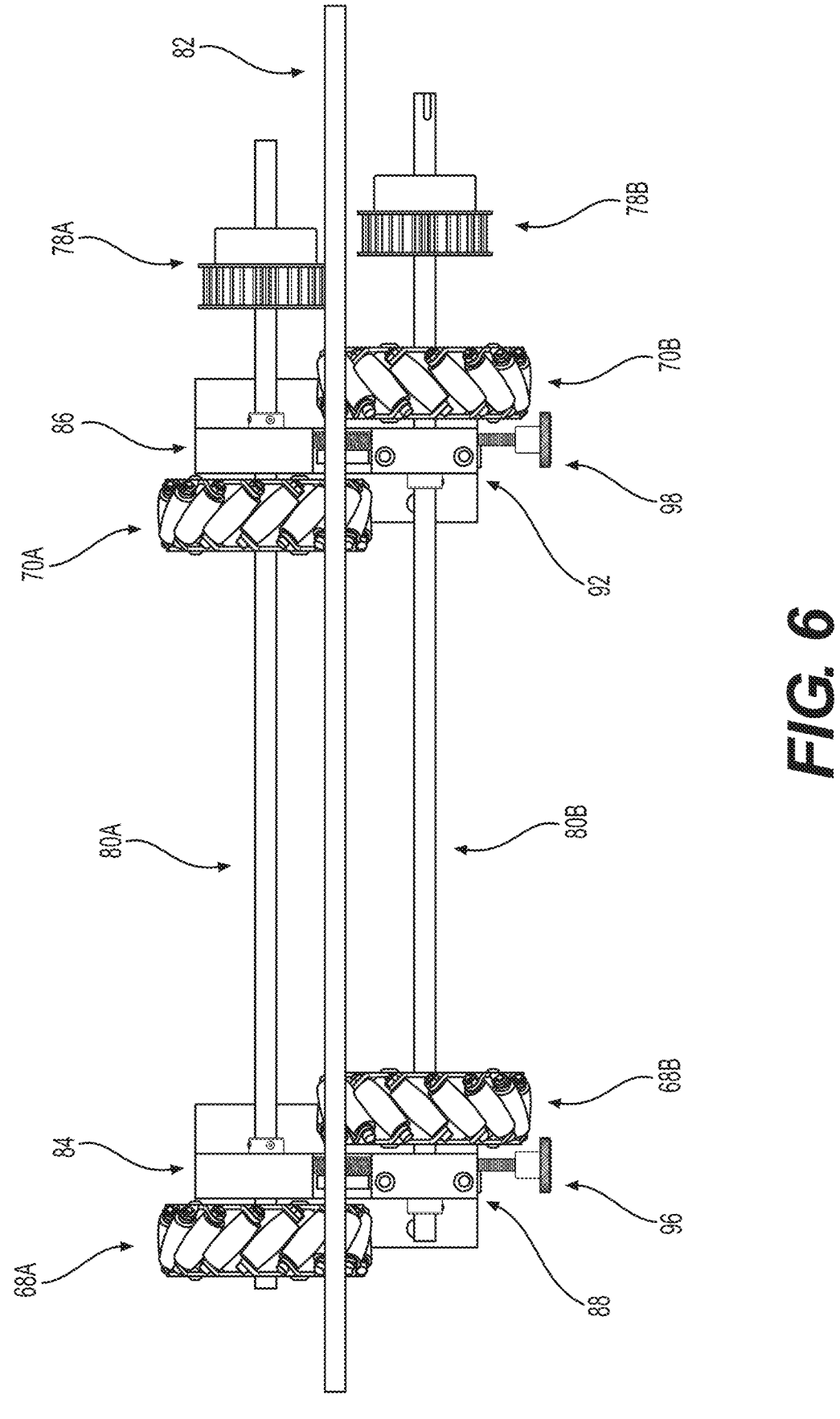
FIG. 6 illustrates a top down view of two pairs of mecanum wheels.

FIG. 6 shows a top down view of mecanum wheels 68A, 68B, 70A, and 70B along with workpiece 82 resting atop the mecanum wheels. Visible in this view are left mounting block 84 and left mounting block 86, each of which supports left rotation drive shaft 80A. Right mounting block 88 and right mounting block 92 each support right rotation drive shaft 80B. Left rotation drive shaft 80A transfers rotational power to left mecanum wheels 68A and 70A along with left mecanum wheels 72A and 74A (not shown in FIG. 6). Right rotation drive shaft 80B transfers rotational power to right mecanum wheels 68B and 70B along with right mecanum wheels 72B and 74B (not shown in FIG. 6).

Mecanum wheels are generally referred to as left-handed or right-handed according to the orientation of the rollers relative to the central hub. In the view presented in FIG. 6, mecanum wheels 68A and 70A have a left-handed orientation, and mecanum wheels 68B and 70B have a right-handed orientation.

Figure 7:
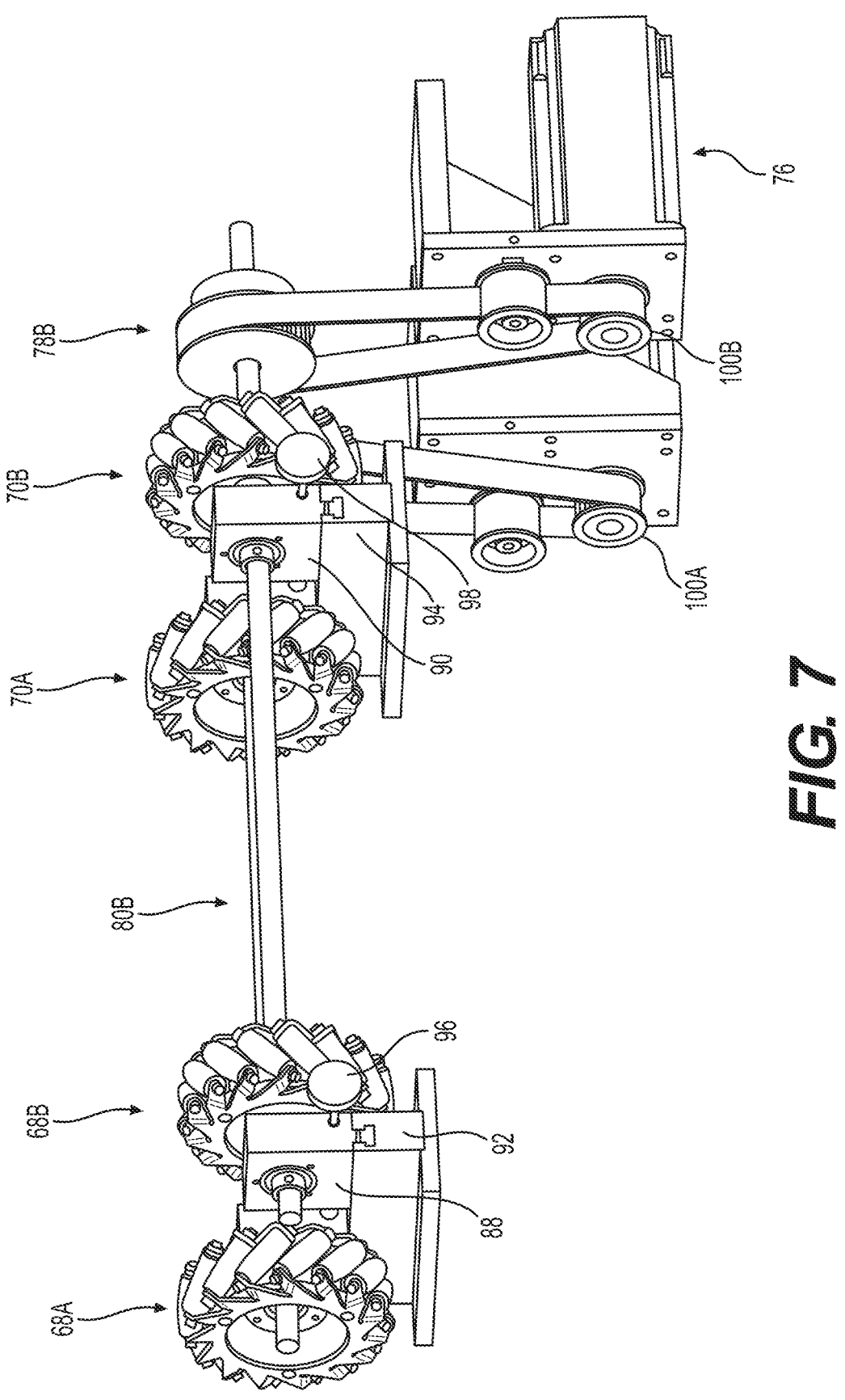
FIG. 7 illustrates a side perspective view of two pairs of mecanum wheels with motors.

As shown in FIG. 7, an adjustment knob 96 can be used to move right mounting block 88 along mounting block track 92. Adjustment knob 98 can be used to move right mounting block 90 along mounting block track 94. Mecanum drive motor 76 powers right drive wheel 100B which, via a belt, rotates right rotation drive wheel 78B, which in turn rotates right rotation drive shaft 80B. A second mecanum drive motor (not visible) powers left drive wheel 100A which, via a belt, rotates left rotation drive wheel 78A (not visible in FIG. 7), which in turn rotates left rotation drive shaft 80A (not visible in FIG. 7).

Figure 8:
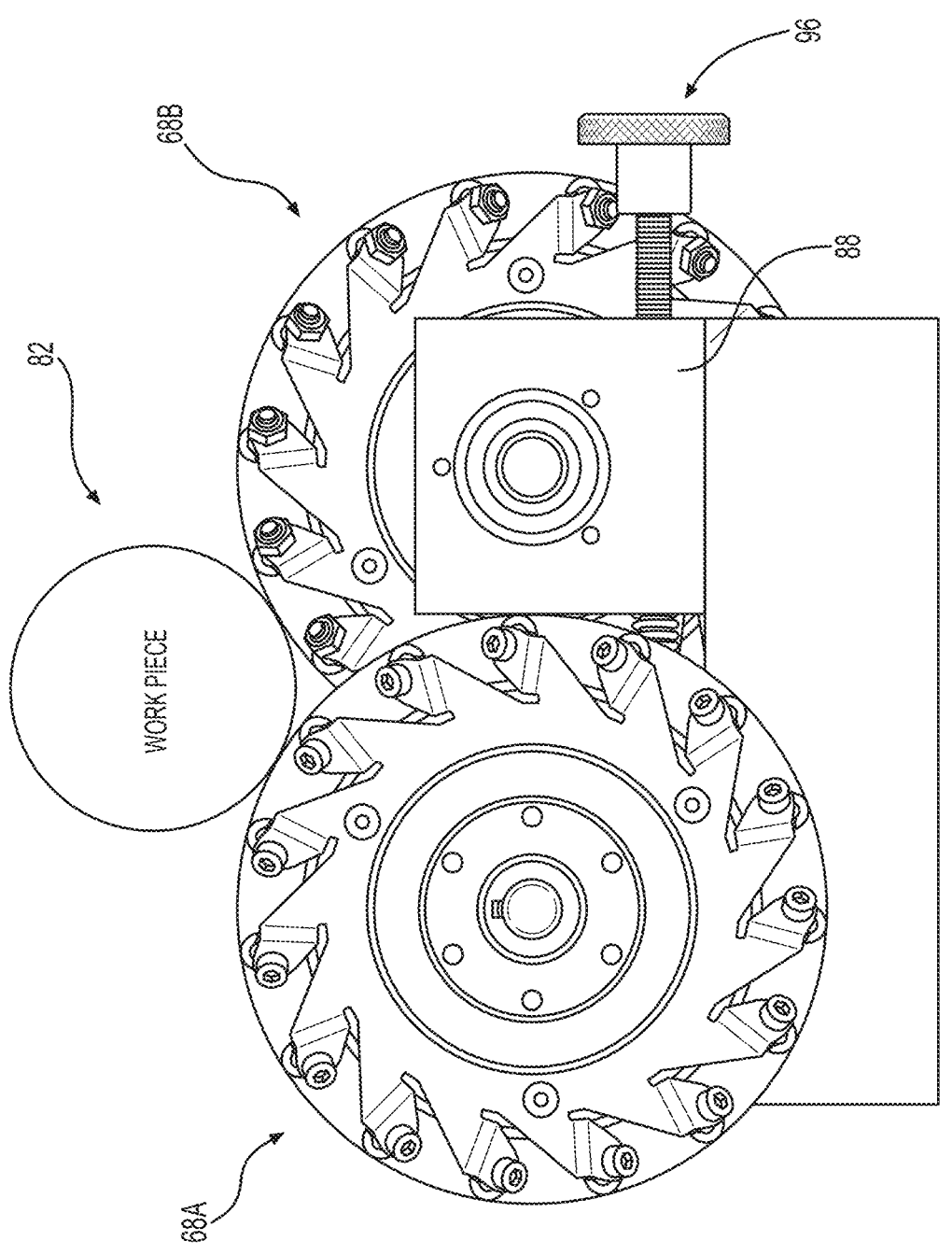
FIG. 8 illustrates an in-line view of a workpiece resting atop two mecanum wheels.

FIG. 8 shows an in-line view of workpiece 82 resting atop left mecanum wheel 68A and 68B. Adjustment knob 96 can be used to adjust the horizontal position of right mounting block 88 and right mecanum wheel 68B. As shown, adjustment knob 96 is operated manually. In some embodiments, adjustment knobs may be moved via electromechanical actuator or other suitable means of control.

Figures 9, 10, 11:
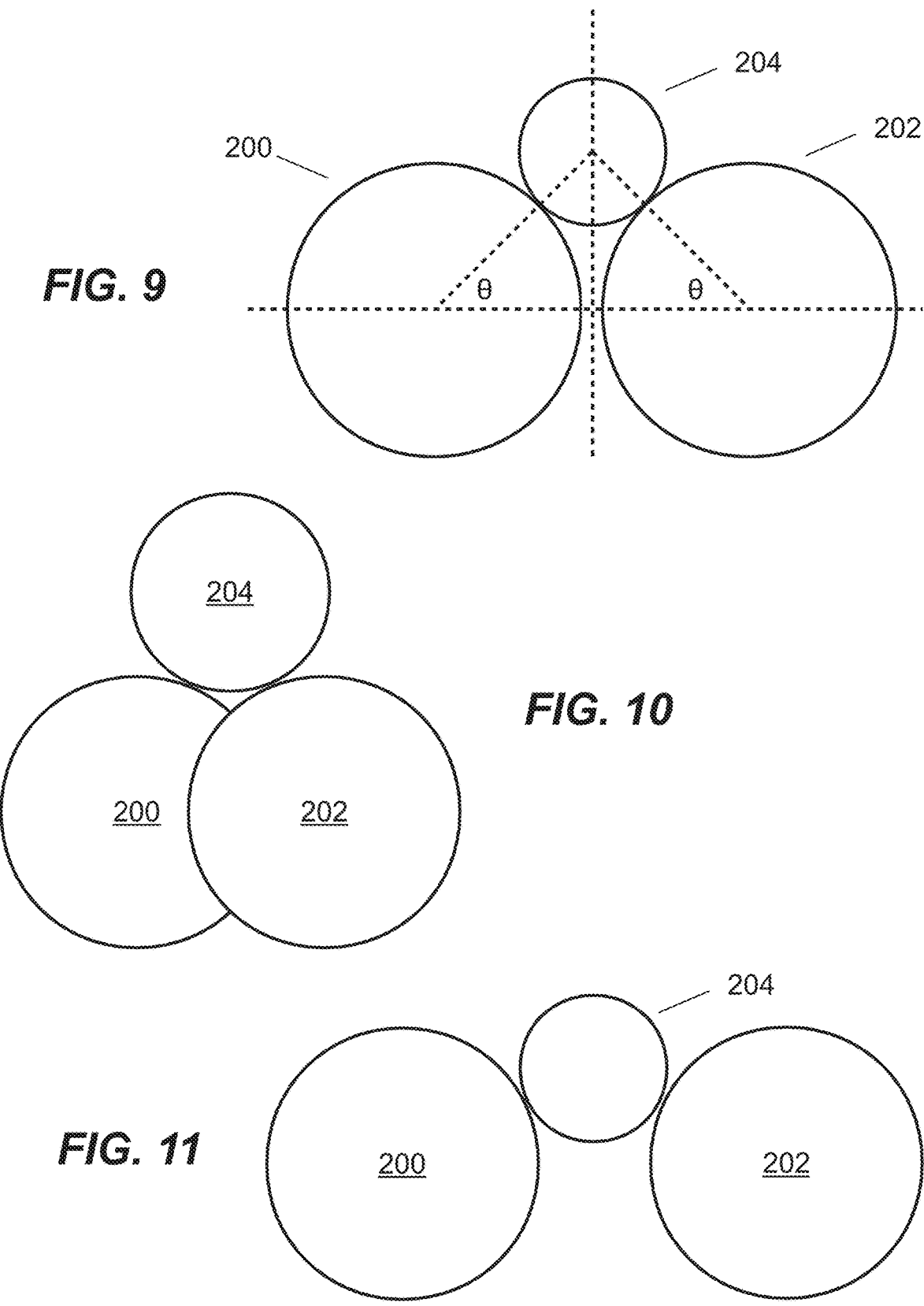
FIG. 9 illustrates a geometric relationship between a workpiece and two mecanum wheels.
FIG. 10 illustrates a geometric relationship between a workpiece and two mecanum wheels.
FIG. 11 illustrates a geometric relationship between a workpiece and two mecanum wheels.

FIG. 9 shows the geometric relationship of a left mecanum wheel 200, right mecanum wheel 202, and workpiece 204. Preferably, the center of workpiece 204 rests along a vertical line spaced evenly between mecanum wheels 200 and 202. The line drawn from the center of workpiece 204 to the center of mecanum wheel 200 forms an angle $\theta$ relative to the horizontal.

FIG. 10 shows workpiece 204 at an undesirably high of an angle $\theta$, corresponding to too close of a gap between mecanum wheels 200 and 202. In this configuration, workpiece 204 is more prone to fall out of its position between the mecanum wheels during operation.

FIG. 11 shows workpiece 204 at an undesirably low angle $\theta$, corresponding to too far of a gap between mecanum wheels 200 and 202. In this configuration, workpiece 204 is more prone to fall down between the mecanum wheels during operation, and it may also cause additional stress on mecanum wheels that exert a large clamping force. During operation of a loader assembly in accordance with the principles disclosed herein, the angle $\theta$ is preferably maintained between approximately 45 degrees and approximately 60 degrees.

Figure 12:
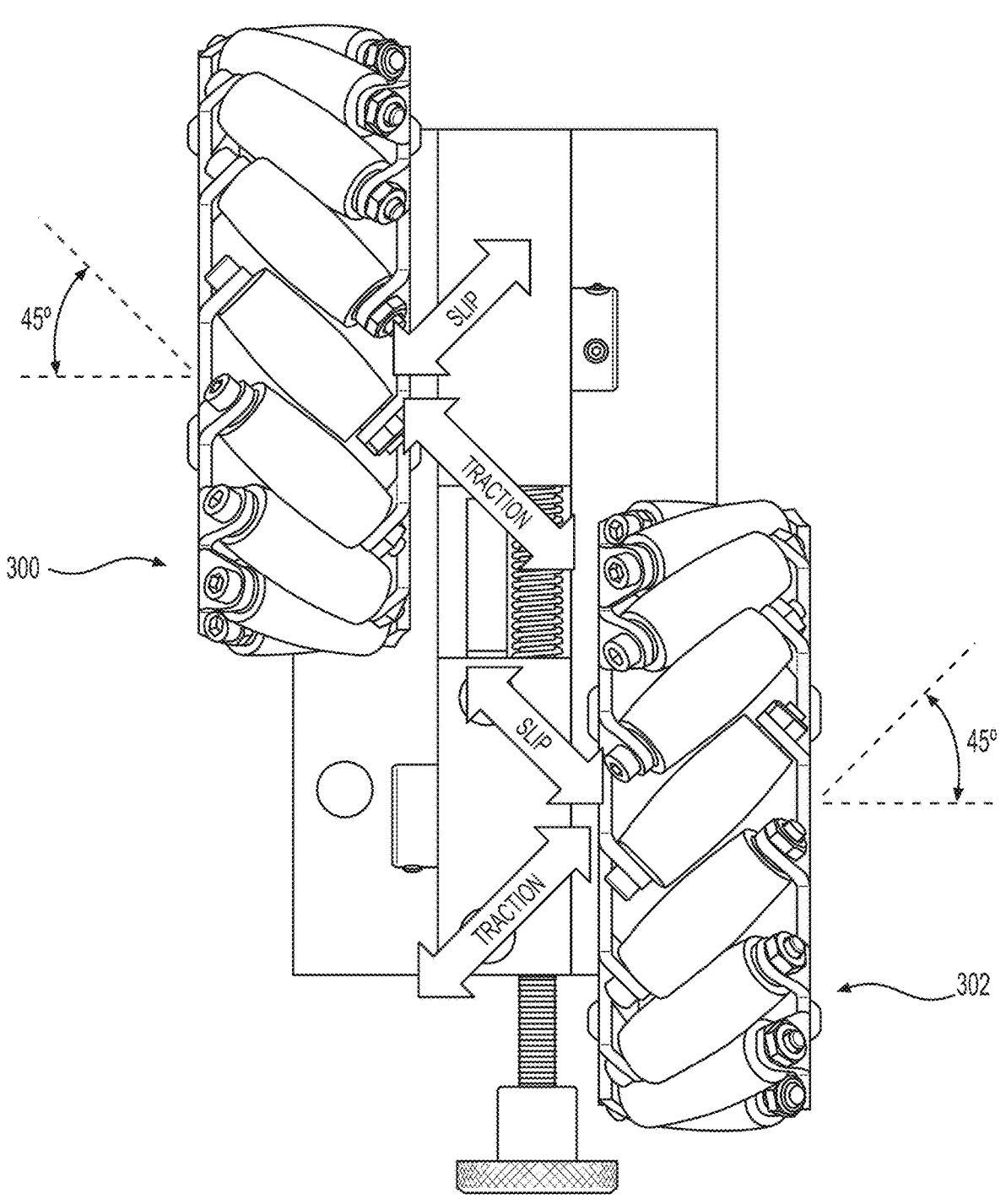
FIG. 12 illustrates the directions of traction and slip for two mecanum wheels.

FIG. 12 shows a top down view of a pair of mecanum wheels 300, 302. The rollers on each mecanum wheel spin freely about their roller bearings, and the surface of the rollers comprises a material suitable to grip a workpiece. The rollers on left-handed mecanum wheel 300 are mounted at a 45 degree angle relative to the axis of rotation of mecanum wheel 300. The rollers on right-handed mecanum wheel 302 are also mounted at a 45 degree angle relative to the axis of rotation of mecanum wheel 302, but perpendicular to the rollers on mecanum wheel 300. For each mecanum wheel, arrows indicate the resulting direction in which the respective rollers will provide traction or slip.

Figure 13:
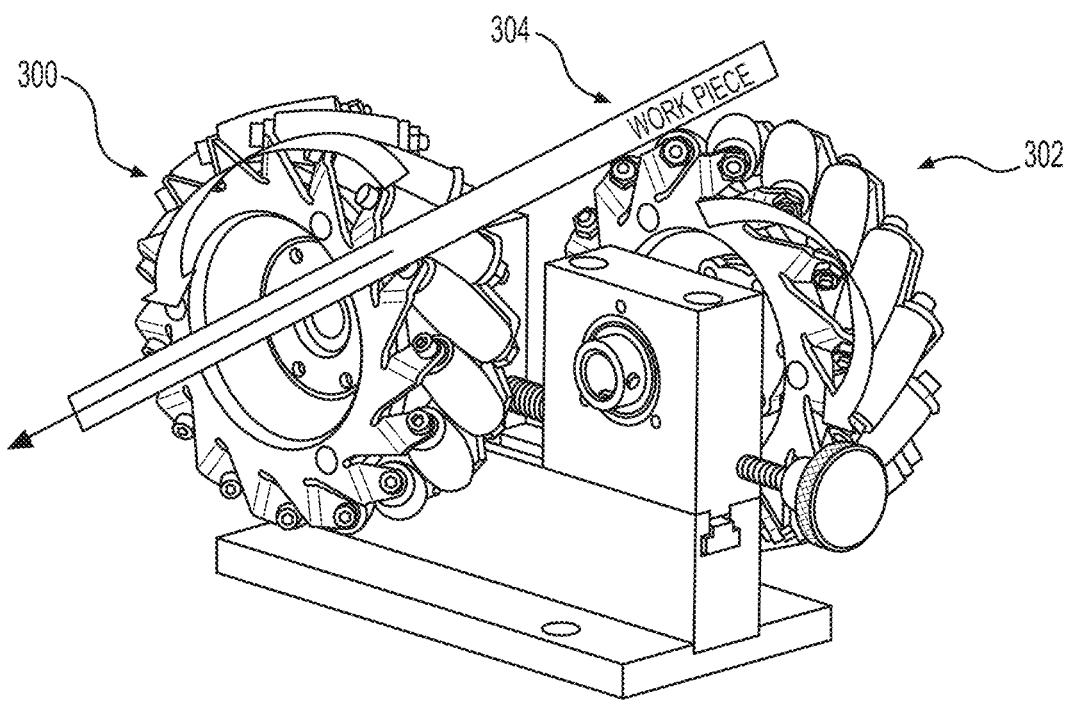
FIG. 13 illustrates a workpiece atop two mecanum wheels rotating in opposite directions.

FIG. 13 shows a perspective view of mecanum wheels 300, 302 with a workpiece 304 resting on top of the wheels. As mecanum wheel 300 turns counterclockwise, its rollers impart a clockwise rotational force on workpiece 304 and also a backward translational force. As mecanum wheel 302 turns equally clockwise, its rollers impart a counterclockwise rotational force on workpiece 304 and also a backward translational force. The equal clockwise and counterclockwise rotational forces offset, and so the workpiece 304 does not rotate. The backward translational forces from mecanum wheels 300 and 302, combined with the free slip of the rollers on each mecanum wheel, result in a backward translational motion of workpiece 304, as indicated by the arrow in FIG. 13.

Figure 14:
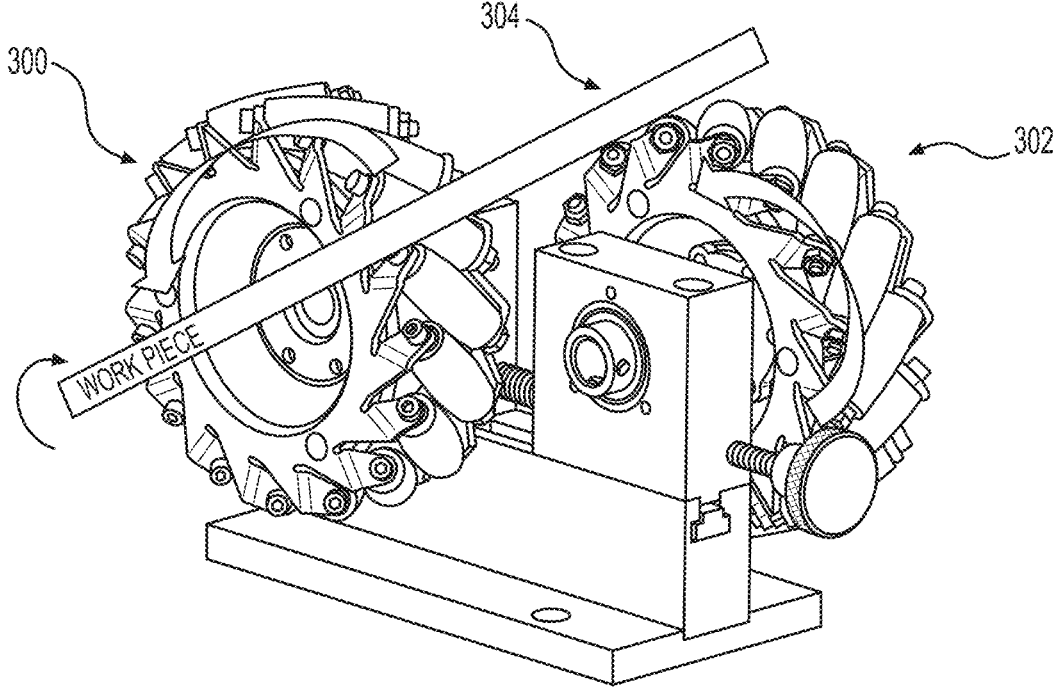
FIG. 14 illustrates a workpiece atop two mecanum wheels rotating counterclockwise.

FIG. 14 shows the movement of workpiece 304 when mecanum wheels 300, 302 both rotate in a counterclockwise direction. As mecanum wheel 300 rotates, its rollers impart a clockwise rotational force and a backward translational force on workpiece 304. As mecanum wheel 302 rotates equally, its rollers impart a clockwise rotational force and a forward translational force on workpiece 304. The forward and backward translational forces offset, and so the workpiece 304 does not move in a forward or backward direction. The clockwise rotational forces from the rollers on both mecanum wheels result in a clockwise rotational motion of workpiece 304, as indicated by the arrow in FIG. 14. The rollers on each mecanum wheel do not spin when the workpiece is only rotating. Workpiece 304 can be made to rotate counterclockwise by reversing the direction of mecanum wheels 300, 302.

Figure 15:
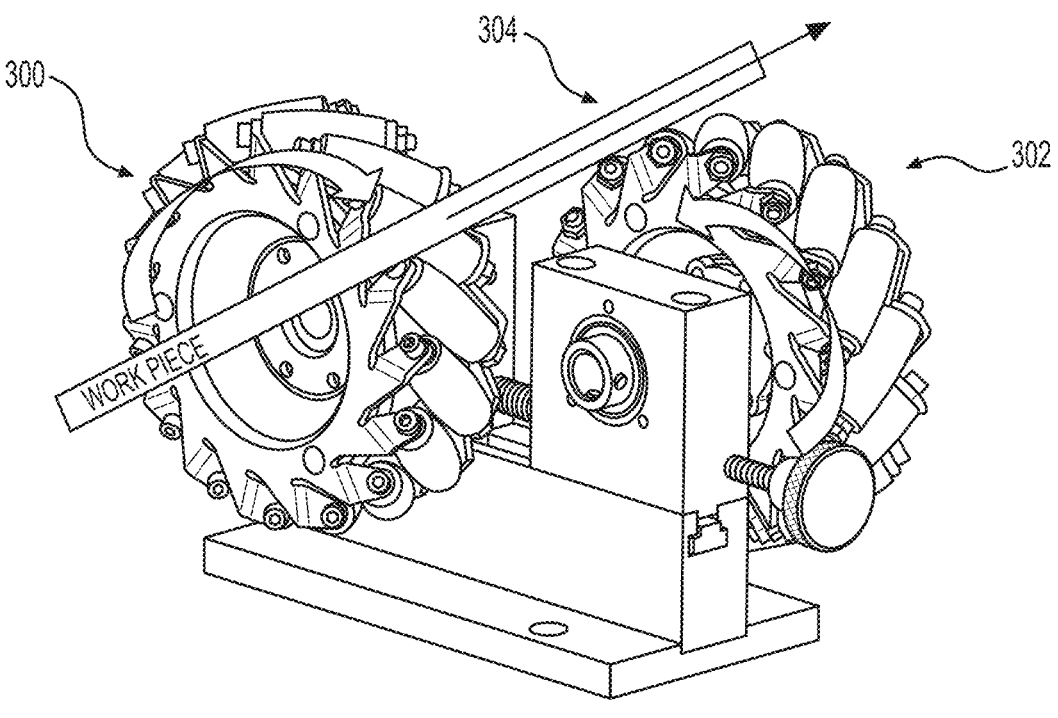
FIG. 15 illustrates a workpiece atop two mecanum wheels rotating in opposite directions.

FIG. 15 shows a perspective view of mecanum wheels 300, 302 with a workpiece 304 resting on top of the wheels. As mecanum wheel 300 turns clockwise, its rollers impart a counterclockwise rotational force on workpiece 304 and also a forward translational force. As mecanum wheel 302 turns counterclockwise equally, its rollers impart a clockwise rotational force on workpiece 304 and also a forward translational force. The equal counterclockwise and clockwise rotational forces offset, and so the workpiece 304 does not rotate. The forward translational forces from mecanum wheels 300 and 302 result in a forward translational motion of workpiece 304, as indicated by the arrow in FIG. 15.

The configuration depicted in FIG. 15, in which two mecanum rollers rotate inwards toward the workpiece, is found to provide generally more stability when moving a workpiece in a translational direction than when the rollers rotate outwards. Thus, an environment in which a workpiece is primarily driven in one translational direction, or an environment which requires additional stability when moving a workpiece in one translational direction, may benefit from a configuration of mecanum rollers that rotate inwards to provide translational motion in the desired direction.

Figure 16:
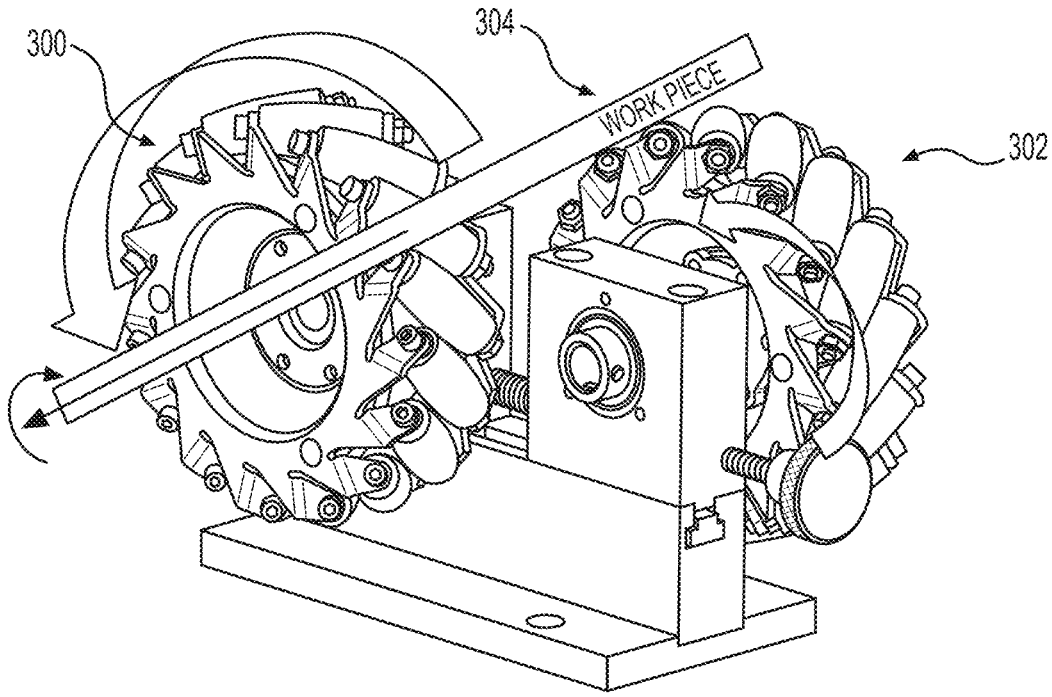
FIG. 16 illustrates a workpiece atop two mecanum wheels rotating counterclockwise at different speeds.

As demonstrated, the direction and speed of mecanum wheels 300 and 302 can be adjusted to cause workpiece 304 to move forward or backward without rotation, or to rotate clockwise or counterclockwise without translational motion. The direction and speed of mecanum wheels 300 and 302 can further be adjusted to cause workpiece 304 to both rotate and move translationally, with varying directions and magnitudes of rotational speed versus translational speed. For example, FIG. 16 shows mecanum wheels 300, 302 turning in a counterclockwise direction, except that mecanum wheel 300 is turning at a faster speed than mecanum wheel 302. The result is that workpiece 304 moves in a backward direction while also rotating in a clockwise direction.

Applying the principles disclosed herein, the direction and speed of mecanum wheels 300, 302 can be adjusted to cause workpiece 304 to move with either forward or backward translational motion simultaneous with either clockwise or counterclockwise rotational motion. Further, the direction and speed of translational motion can be controlled independently of the direction and speed of rotational motion.

A loader assembly incorporating the principles disclosed herein can be controlled to provide a workpiece into a centerless grinder, providing a desired forward translational speed of the workpiece into the grinder while also providing a desired rotational speed to match the rotation of the workpiece as it is passes through the grinder. A second loader assembly receiving a workpiece on the exit side of a centerless grinder can likewise match the translational speed and rotational speed of the finished workpiece. If a subsequent pass of the workpiece through the centerless grinder is desired, the loader assemblies can be controlled to raise the height of the workpiece above the height of the grinding zone in the centerless grinder. Then the mecanum wheels can be controlled to move the workpiece quickly, without the need for rotation, back to the entry side of the centerless grinder.

While the embodiment shown in FIG. 5 comprises four offset pairs of mecanum wheels, it should be understood that fewer or more may be employed in a loader assembly without departing from the principles disclosed herein. The number and configuration of offset compound wheels may be varied to better achieve a particular intended purpose for a loader assembly.

A loader assembly according to the principles disclosed herein can be used to support and move a bar, an example of which would be feeding the bar into a centerless grinder. Working with a bar presents additional considerations. For example, a thin bar will typically be less rigid than a thicker bar, and thus may start to bend if it is not sufficiently supported. Accordingly, a loader assembly intended to manipulate thin bars will benefit from a higher density of compound wheel pairs and/or supports to reduce or eliminate undesired bending of the bars. Table 1 shows a preferred, but non-limiting, diameter and density of compound wheel pairs for a loader assembly according to the bar diameter:

TABLE 1

| Diameter of Bar | Diameter of Compound Wheels | Density of Wheels in Direction of Travel |
|---|---|---|
| 3/4"-4.0" | 8" | 14"-28" |
| 1/2"-2.5" | 6" | 16"-24" |
| 1/8"-3.0" | 6" | 6"-16" |
| 1/8"-2.0" | 4" | 6"-16" |

In general, a higher density of compound wheel pairs will increase the maximum payload of a loader assembly because the weight of the workpiece is spread out over more wheels. Also, in general, larger compound wheels have larger rollers that tend not to deform as much as comparable compound wheels of smaller size. This is due to larger contact patches between a workpiece and the rollers. A heavy workpiece can deform rollers comprising soft materials or rollers on small compound wheels. The deformation can reach the point that the workpiece effectively bounces when transitioning from contact with one roller to contact with the next roller on a compound wheel. To account for this, the effective weight of the workpiece on a compound wheel is preferably substantially less than the payload rating for the compound wheel.

Figure 17:
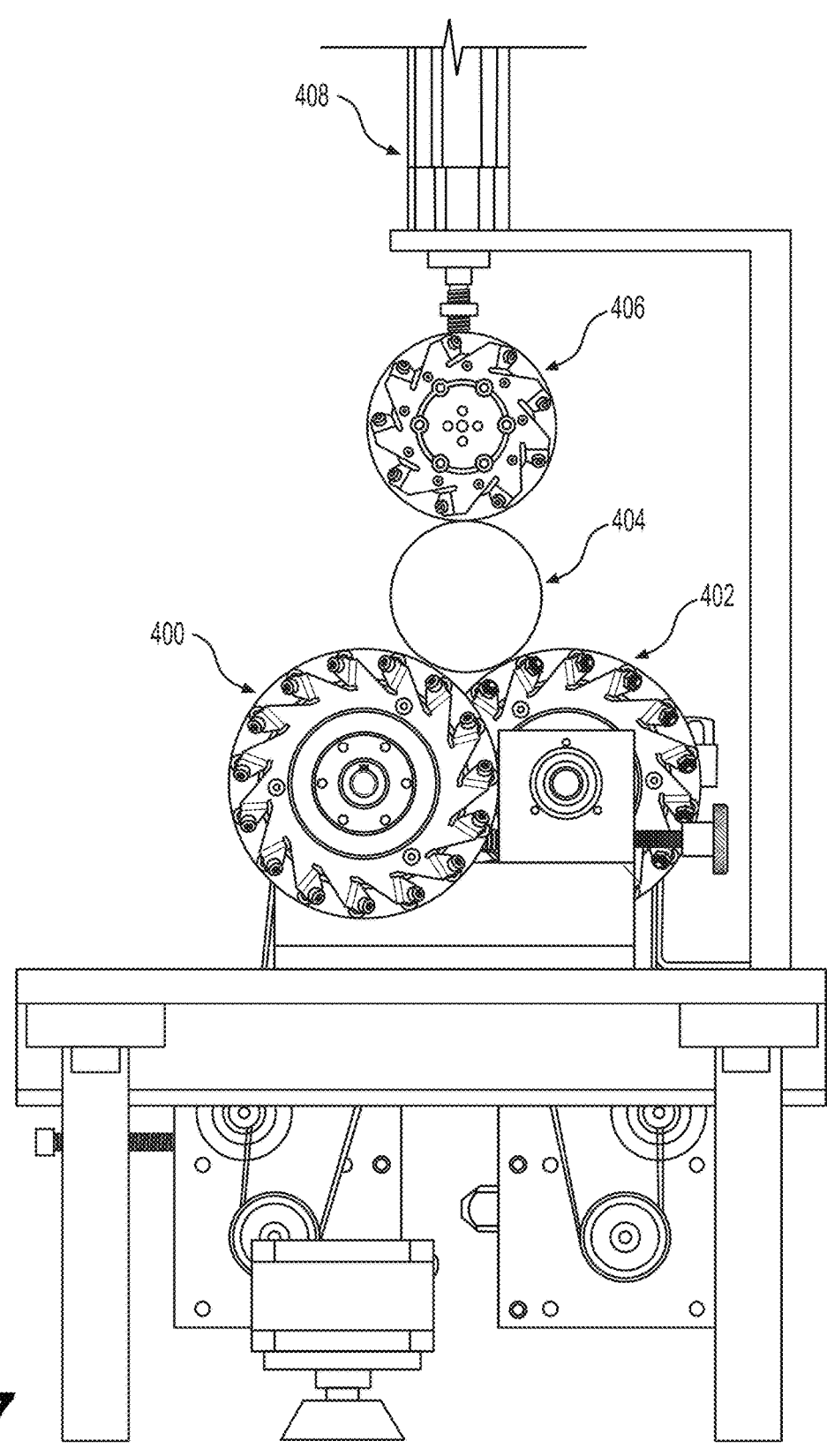
FIG. 17 illustrates a workpiece atop two mecanum wheels and stabilized by an omni wheel.

FIG. 17 shows an end view of an embodiment in which two mecanum wheels 400, 402 support a workpiece 404. In this embodiment, a mecanum wheel 406 is positioned above workpiece 404 and is positioned to secure workpiece 404 against omni wheels 400, 402. An actuator 408 comprising a pneumatic clamping cylinder controls the position and downward clamping force of mecanum wheel 406. Actuator 408 can be used to raise mecanum wheel 406 to leave space for a new workpiece to be loaded onto mecanum wheels 400, 402. In some embodiments, downward force on mecanum wheel 406 is provided by weights on a slide coupled to mecanum wheel 406, and/or one or more springs coupled to mecanum wheel 406, or other suitable means of providing downward force to facilitate mecanum wheel 406 securing workpiece 406 during operation. A compound clamping wheel, such as mecanum wheel 406 shown in FIG. 17, provides increased traction for potentially wet workpieces and can be used to position bent workpieces so that they maintain more consistent contact with the supporting pairs of compound wheels below.

As shown in FIG. 17, mecanum wheel 406 is left idle and passively spins as workpiece 404 moves beneath it. A motor or other suitable means of providing power to mecanum wheel 406 may be used without departing from the principles described herein, which would enable mecanum wheel 406 to provide additional translational force to workpiece 404. An omni wheel, powered or unpowered, may be used in place of, or in addition to, mecanum wheel 406 to provide stability and/or additional translational and/or rotational movement to workpiece 404. Mecanum wheel 406, or a compound wheel used in its place, is preferably oriented so that the wheel's axis of rotation is substantially parallel with the length of workpiece 404. Embodiments in which mecanum wheel 406, or a compound wheel used in its place, is oriented with an axis of rotation perpendicular to the length of workpiece 404 may experience undesirable vibration during operation. Contact between idlers are found to be smoother when the axle of the compound wheel is parallel to the workpiece.

Embodiments depicting pairs of mecanum rollers herein, such as the pairs of mecanum wheels shown in FIG. 6, show a left-handed mecanum wheel paired with an offset right-handed mecanum wheel. Other configurations may be employed without departing from the principles disclosed herein. For example, the locations of the left-handed mecanum wheel and the right-handed mecanum wheel could be reversed. A pair of offset left-handed mecanum wheels or a pair of offset right-handed mecanum wheels could be employed. In each case, the direction of travel of each wheel would need to be determined for the desired rotational or translational motion of the workpiece. Further, the mecanum wheels shown herein have rollers at a 45-degree angle relative to their axis of rotation. Mecanum wheels with other roller angles may be employed without departing from the principles disclosed herein. For example, an offset pair of mecanum wheels could comprise mecanum wheels with a 30-degree (or 60-degree) roller orientation. As another example, an offset pair of mecanum wheels could comprise one wheel with a 30-degree roller orientation paired with a mecanum wheel with a 60-degree roller orientation. The foregoing examples are not limiting and are meant to be illustrative of the variety of configurations available.

Figures 18, 19:
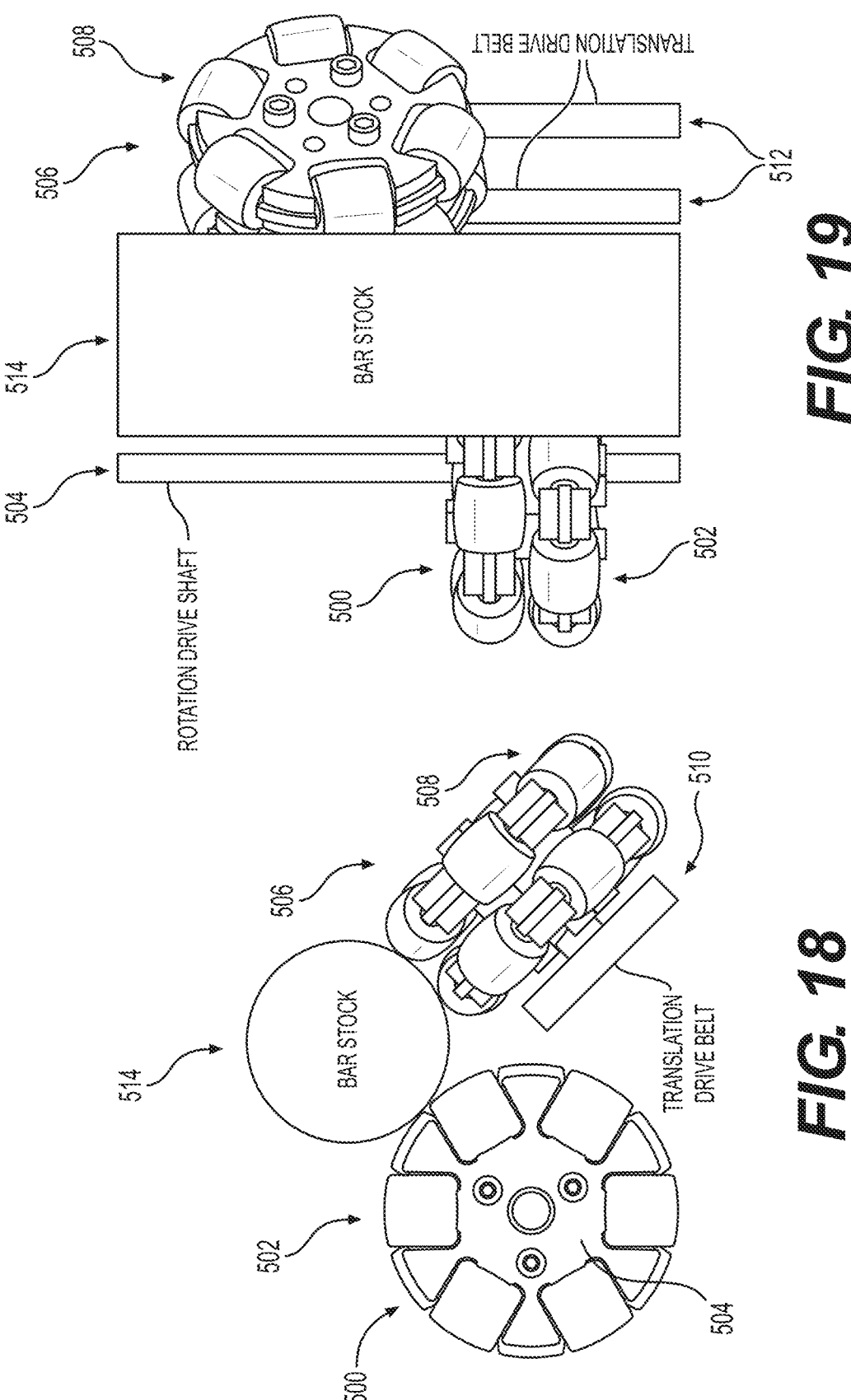
FIG. 18 illustrates an in-line view of two omni wheels supporting a workpiece.
FIG. 19 illustrates a top down view of two omni wheels supporting a workpiece.

FIGS. 18 and 19 show how a pair of omni wheels can be used with a loader assembly as disclosed herein. Left omni wheel 500 comprises a set of rollers, one of which is labeled 502, and a rotation drive shaft 504. Left omni wheel 500 is turned by rotation drive shaft 504, which can be powered by a drive motor (not shown). Right omni wheel 506 comprises a set of rollers, one of which is labeled 508. Right omni roller is coupled to and turned by translation drive belt 510, which is powered by a drive motor (not shown). As left omni wheel 500 spins, it rotates workpiece 514. The rollers on left omni wheel 500 spin freely, which does not interfere with the translational motion of workpiece 514. As right omni wheel 506 spins, it moves workpiece 514 translationally forward or backward. The rollers on right omni wheel spin freely, which does not interfere with the rotation of workpiece 514.

In another embodiment, an offset pair of compound wheels comprises an omni wheel paired with a mecanum wheel. The translational and/or rotational speed of a workpiece can be controlled by adjusting the direction and rotational speed of the omni wheel relative to the direction and rotational speed of the mecanum wheel.

Whereas the embodiment shown in FIG. 5 comprises first platform 48, second platform 50, and third platform 52, other embodiments can employ one or more pairs of offset compound wheels without comprising one or more or all of such platforms. By way of non-limiting examples, a pair of offset compound wheels can be mounted on blocks or posts or rods such that they are not coupled to any platform.

In some embodiments, a pair of offset compound wheels can be powered by one or more motors, as described herein, or by alternative means. For example, a compound wheel may be powered by hydraulics or by hand.

The detailed description is not intended to be limiting or represent an exhaustive enumeration of all embodiments incorporating the principles disclosed herein. It will be apparent to those of skill in the art that numerous changes may be made in such details without departing from the spirit of the principles disclosed herein.

What is claimed is:

1. A loader assembly, the loader assembly comprising:
   a first left mecanum wheel configured to rotate about a first axis;
   a second left mecanum wheel configured to rotate about the first axis;
   a first right mecanum wheel offset from the first left mecanum wheel and configured to rotate about a second axis that is substantially parallel to and offset from the first axis;
   a second right mecanum wheel offset from the second left mecanum wheel and configured to rotate about the second axis;
   a left mecanum drive motor coupled to a left drive shaft, the left drive shaft coupled to the first left mecanum wheel and the second left mecanum wheel;
   a right mecanum drive motor coupled to a right drive shaft, the right drive shaft coupled to the first right mecanum wheel and the second right mecanum wheel;
   wherein the left drive shaft and the right drive shaft are substantially parallel.

2. A loader assembly according to claim 1, the loader assembly comprising:
   at least one height jack configured to raise or lower the first left mecanum wheel, the second left mecanum wheel, the first right mecanum wheel, and the second right mecanum wheel; and
   at least one slide track along which the first left mecanum wheel, the second left mecanum wheel, the first right mecanum wheel, and the second right mecanum wheel can be moved horizontally.

3. A loader assembly according to claim 1, wherein:
   the first right mecanum wheel is slidable within a first track; and
   the second right mecanum wheel is slidable within a second track.

4. A loader assembly according to claim 1, the loader assembly comprising:
   a third left mecanum wheel coupled to the left drive shaft;
   a fourth left mecanum wheel coupled to the left drive shaft;
   a third right mecanum wheel coupled to the right drive shaft; and
   a fourth right mecanum wheel coupled to the right drive shaft.

5. A loader assembly according to claim 1, the loader assembly comprising:
   a controller configured to:
      control the left mecanum drive motor; and
      control the right mecanum drive motor.

6. A loader assembly according to claim 5, wherein the controller is configured to control the height and lateral position of each of the first left mecanum wheel, the second left mecanum wheel, the first right mecanum wheel, and the second right mecanum wheel.

7. A loader assembly according to claim 1, the loader assembly comprising at least one stabilizer wheel proximate to the first left mecanum wheel and the first right mecanum wheel, the stabilizer wheel configured to rotate about a third axis that is offset from the first axis and the second axis.

8. A loader assembly according to claim 7, wherein the at least one stabilizer wheel comprises an omni wheel.

9. A loader assembly according to claim 1, wherein:
the first mecanum wheel is of a first-handed orientation;
the second mecanum wheel is of the first-handed orientation;
the third mecanum wheel is of a second-handed orientation;
the fourth mecanum wheel is of the second-handed orientation; and
the first-handed orientation and the second-handed orientation are different.

10. A loader assembly according to claim 9, wherein:
the first mecanum wheel is selectively slidable relative to the third mecanum wheel; and
the second mecanum wheel is slidable relative to the fourth mecanum wheel.

11. A loader assembly according to claim 9, the loader assembly comprising:
a fifth mecanum wheel configured to rotate about the first axis and coupled to the first drive shaft;
a sixth mecanum wheel configured to rotate about the first axis and coupled to the first drive shaft;
a seventh mecanum wheel configured to rotate about the second axis and coupled to the second drive shaft; and
an eighth mecanum wheel configured to rotate about the second axis and coupled to the second drive shaft.

12. A loader assembly according to claim 9, the loader assembly comprising at least one stabilizer wheel proximate to the first left mecanum wheel and the first right mecanum wheel, the stabilizer wheel configured to rotate about a third axis that is offset from the first axis and the second axis.

13. A loader assembly according to claim 12, wherein the at least one stabilizer wheel comprises an omni wheel.

14. The loader assembly of claim 9, wherein:
the third mecanum wheel is proximate to the first mecanum wheel; and
the fourth mecanum wheel is proximate to the second mecanum wheel.

15. A loader assembly according to claim 14, wherein:
the first-handed orientation is a left-handed orientation; and
the second-handed orientation is a right-handed orientation.

16. A loader assembly according to claim 14, wherein:
the first-handed orientation is a right-handed orientation; and
the second-handed orientation is a left-handed orientation.

17. A loader assembly according to claim 16, the loader assembly comprising a controller configured to control the first motor, the second motor, the third motor, and the fourth motor.

18. A method of controlling the movement of a workpiece, the method comprising:
positioning an elongated workpiece to rest on a plurality of left compound wheels and a plurality of right compound wheels offset from the plurality of left compound wheels, such that the elongated workpiece is in substantial contact with each of the plurality of left compound wheels and the plurality of right compound wheels, and such that the elongated workpiece has an axis that is substantially parallel to an axis of rotation of the plurality of left compound wheels, and such that the elongated workpiece has an axis that is substantially parallel to an axis of rotation of the plurality of right compound wheels;
rotating the plurality of left compound wheels;
rotating the plurality of right compound wheels independently of the plurality of left compound wheels.

19. The method of claim 18, further comprising:
adjusting a lateral position of the plurality of right mecanum wheels to change the distance between the axis of rotation of the plurality of right mecanum wheels and the axis of rotation of the plurality of left mecanum wheels.

20. The method of claim 18, further comprising:
rotating the plurality of left compound wheels and rotating the plurality of right compound wheels to simultaneously move the elongated workpiece in a first translational direction and a first rotational direction; and
subsequently rotating the plurality of plurality of left compound wheels and rotating the plurality of right compound wheels to move the elongated workpiece in a second translational direction that is opposite of the first translational direction.

* * * * *